United States Patent
Watanabe et al.

(10) Patent No.: US 8,028,054 B1
(45) Date of Patent: *Sep. 27, 2011

(54) SYSTEM AND METHOD FOR COORDINATED BRINGUP OF A STORAGE APPLIANCE IN A CLUSTER CONFIGURATION

(75) Inventors: Steven S. Watanabe, San Jose, CA (US); Susan M. Coatney, Cupertino, CA (US); Alan L. Rowe, San Jose, CA (US); Ye Sun, Providence, RI (US)

(73) Assignee: NetApp, Inc., Sunnyvale, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 11/866,011

(22) Filed: Oct. 2, 2007

Related U.S. Application Data

(63) Continuation of application No. 10/767,640, filed on Jan. 29, 2004, now Pat. No. 7,293,195.

(51) Int. Cl.
*G06F 15/16* (2006.01)
*G06F 11/20* (2006.01)

(52) U.S. Cl. .................. 709/223; 714/9; 714/3

(58) Field of Classification Search ............... 709/212
See application file for complete search history.

(56) References Cited

U.S. PATENT DOCUMENTS

| | | | |
|---|---|---|---|
| 4,543,627 A | 9/1985 | Schwab | |
| 5,680,580 A | 10/1997 | Beardsley et al. | |
| 5,790,775 A * | 8/1998 | Marks et al. | 714/9 |
| 5,819,292 A | 10/1998 | Hitz et al. | |
| 5,987,621 A * | 11/1999 | Duso et al. | 714/4 |
| 6,578,158 B1 * | 6/2003 | Deitz et al. | 714/11 |
| 6,681,339 B2 | 1/2004 | McKean et al. | |
| 6,694,447 B1 * | 2/2004 | Leach et al. | 714/6 |
| 6,715,098 B2 * | 3/2004 | Chen et al. | 714/3 |
| 6,732,289 B1 | 5/2004 | Talagala et al. | |
| 6,775,702 B2 | 8/2004 | Oeda et al. | |
| 6,804,673 B2 * | 10/2004 | Sugahara et al. | 707/10 |
| 6,931,567 B2 | 8/2005 | Tanaka et al. | |
| 7,039,828 B1 | 5/2006 | Scott | |
| 7,185,228 B2 * | 2/2007 | Achiwa | 714/20 |
| 7,231,489 B1 | 6/2007 | Larson et al. | |
| 7,260,737 B1 | 8/2007 | Lent et al. | |
| 7,293,195 B1 * | 11/2007 | Watanabe et al. | 714/9 |

(Continued)

FOREIGN PATENT DOCUMENTS

WO 01/35244 A1 5/2001

OTHER PUBLICATIONS

Hitz, David, TR3002 File System Design for a NFS File Server Appliance, Network Appliance, Inc.

(Continued)

*Primary Examiner* — Bunjob Jaroenchonwanit
(74) *Attorney, Agent, or Firm* — Cesari and McKenna, LLP

(57) ABSTRACT

A system and method for coordinated bringup of a storage appliance in a storage appliance cluster. The repaired storage appliance, during its initialization, sets a variety of state values in a predetermined memory location comprising a state data structure, which is detected by a remote direct memory access read operation by the surviving storage appliance. By the use of the RDMA operations, the repaired storage appliance and surviving storage appliance coordinate the bringup and giveback of data servicing functionality.

25 Claims, 5 Drawing Sheets

U.S. PATENT DOCUMENTS

| | | |
|---|---|---|
| 7,664,913 B2 | 2/2010 | Cassell et al. |
| 2003/0018927 A1 | 1/2003 | Gadir et al. |
| 2003/0088638 A1 | 5/2003 | Gluck et al. |
| 2004/0010545 A1 | 1/2004 | Pandya |
| 2004/0030668 A1 | 2/2004 | Pawlowski et al. |
| 2006/0271814 A1 | 11/2006 | Fung et al. |

OTHER PUBLICATIONS

Shirriff, Kenneth W., Sawmill:A Logging File System for a High-Performance RAID Disk Array, CSD-95-862, Jan. 1995.

Tweten, David, Hiding Mass Storage Under UNIX: NASA's MSS-H Architecture, IEEE Symposium on Mass Storage, pp. 140-145, May 1990.

Wilkes, John, et al., The HP AutoRAID Hierarchical Storage System, ACM Transactions on Computer Systems, Feb. 1996, vol. 14, pp. 108-136.

European Search Report for Application No. EP 01 01 6755, Nov. 8, 2004 pp. 1-3.

Anupam Bhide, Elmootazbellah N. Elnozahy, Stephen P. Morgan, "A Highly Available Network File Server," Proceedings of the Winter 1991 USENIX Conference, Jan. 21-25, 1991, pp. 199-205.

Wikipedia's Data Structure article revision from Jan. 7, 2004 found at http://en.wikipedia.org/w/index.php?title=Data_structure&oldid=2102708.

U.S. Appl. No. 10/767,640, filed Jan. 29, 2004 by Steven S. Watanabe et al. for a System and Method for Coordinated Bringup of a Storage Appliance in a Cluster Configuration, all pages.

Hitz, David, TR3002 File System Design for a NFS File Server Appliance, Network Appliance, Inc. Jan. 1994.

* cited by examiner

SYSTEM AND METHOD FOR COORDINATED BRINGUP OF A STORAGE APPLIANCE IN A CLUSTER CONFIGURATION

RELATED APPLICATIONS

This application is a continuation of U.S. Ser. No. 10/767,640, filed by Steven S. Watanabe et al. on Jan. 29, 2004, now issued as U.S. Pat. No. 7,293,195 on Nov. 6, 2007.

FIELD OF THE INVENTION

The present invention relates to clustered storage systems and, in particular, to initializing a storage system after a takeover operation.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as FCP.

One example of a SAN arrangement, including a multi-protocol storage appliance suitable for use in the SAN, is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS by Brian Pawlowski et al., now published as U.S. Patent Publication No. 2004/0030668 A1 on Feb. 12, 2004.

It is advantageous for the services and data provided by a storage system, such as a storage system, to be available for access to the greatest degree possible. Accordingly, some storage systems provide a plurality of storage systems organized as a storage system cluster, with a property that when a first storage system fails, the second storage system is available to take over and provide the services and the data otherwise provided by the first storage system. When the first storage system fails, the second storage system in the cluster (the "partner") assumes the tasks of processing and handling any data access requests normally processed by the first storage system. One such example of a storage system cluster configuration is described in U.S. patent application Ser. No. 10/421,297, entitled SYSTEM AND METHOD FOR TRANSPORT-LEVEL FAILOVER OF FCP DEVICES IN A CLUSTER, by Arthur F. Lent, et al., now issued as U.S. Pat. No. 7,260,737 on Aug. 21, 2007. In such a storage system cluster, an administrator may desire to take one of the storage systems offline for a variety of reasons including, for example, to upgrade hardware, etc. In such situations, it may be advantageous to perform a "voluntary" user-initiated takeover operation, as opposed to a failover operation. After the takeover operation is complete, the storage appliance's data is serviced by its partner until a giveback operation is performed. As such, the terms "failover" and "takeover" may be used interchangeably.

During the takeover operation, the surviving storage appliance sets SCSI reservations on the disks normally serviced by the repaired storage appliance. These SCSI reservations prevent any other devices from accessing the disks. The use of SCSI reservations in a cluster failover operation is further described in U.S. patent application Ser. No. 10/086,657, entitled APPLIANCE AND METHOD FOR CLUSTERED FAILOVER WITHOUT NETWORK SUPPORT, by John A. Scott, now issued as U.S. Pat. No. 7,039,828 on May 2, 2006. Additionally, the surviving storage appliances sets an appropriate state in an on-disk mailbox signifying that it has taken over the repaired storage appliance. The on-disk mailbox is a known location on disks that is accessible by the storage appliances in a cluster for transmitting messages and status information during cluster operation. On-disk mailboxes are further described in U.S. patent application Ser. No. 10/378,400, entitled APPLIANCE AND METHOD FOR COORDINATING CLUSTER STATE INFORMATION, by Richard O. Larson, et al., now issued as U.S. Pat. No. 7,231,489 on Jun. 12, 2007.

During normal cluster operation, when a storage appliance fails, the surviving storage appliance performs a failover operation. After the failover, the surviving partner processes data access requests that were originally directed to both the surviving storage appliance and the failed storage appliance. An appliance administrator or user then repairs the failed (now repaired) storage appliance and begins the initialization, or boot, process for the repaired storage appliance. The repaired storage appliance detects a set of disk reservations on its disks and halts its initialization process. The administrator then executes a giveback command on the surviving storage appliance, which causes the disk reservations to be cleared. Once the giveback command is executed on the surviving storage appliance, the storage appliance stops processing data access requests directed to the repaired storage appliance. The repaired storage appliance then restarts its initialization procedure and begins processing data access requests.

A noted disadvantage of the prior art is that during the time from the initiation of the giveback command until the time when the repaired storage appliance has completed its boot process and initialized its disk subsystem, clients of the repaired storage appliance experience a loss of connectivity to data. This loss of connectivity to data may be in the tens of seconds. During this time, clients of the repaired storage appliance are not able to access their data serviced by the repaired storage appliance, nor may they complete write operations to store additional data.

Another noted disadvantage of the prior art is that if the repaired storage appliance is not functional when the giveback command is executed, a failover procedure may be initiated immediately after the surviving storage appliance had already ceased serving data access requests directed to the failed or repaired storage appliance. This can result in a further loss of data connectivity for clients of the storage appliance. Additionally, the repaired storage system may fail to reinitialize and the surviving storage system may not initiate another takeover application. In such an event, clients of the repaired (now failed) storage system are without data connectivity until the failed storage system is manually repaired and reinitialized.

SUMMARY OF THE INVENTION

The present invention overcomes the disadvantages of the prior art by providing a system and method for a coordinated bring up, or re-initialization, of a storage system, such as a storage appliance, in a storage system cluster configuration. The present invention may be utilized after a takeover operation when one of the storage appliances in the cluster has failed and is subsequently repaired by an administrator or user. The repaired storage appliance is initialized and detects that its disks are reserved by the surviving partner storage appliance. The repaired storage appliance then asserts a GIVEWAIT state in a predefined memory status location in the memory of the repaired storage appliance that is monitored illustratively, via remote direct memory access (RDMA) read operations, by the surviving storage appliance. In alternate embodiments, the predefined memory status location is monitored using non-RDMA techniques. When the surviving storage appliance is alerted that the repaired storage appliance is in the GIVEWAIT state, the surviving storage appliance then releases its SCSI disk reservations to the repaired storage appliance's disks that were set during the takeover operation. The repaired storage appliance recognizes the release of the SCSI disk reservations and completes its disk subsystem initialization and retrieves information from its disks to confirm that it was taken over in a failover operation.

Additional information is read from the disks which indicates the node is still taken over. If it is, the repaired storage appliance then sets an MBWAIT state in its memory status location and continues to monitor predefined mailbox locations on disk. In response to the assertion of the MBWAIT state being set, the surviving storage appliance performs a giveback operation by releasing the resources, such as network addresses, that were taken over during the failover operation and modifies the mailbox state to indicate that it is no longer serving data access requests directed to the repaired storage appliance. The repaired storage appliance detects the change in the mailbox state and completes its initialization. Once its initialization is complete, the repaired storage appliance begins processing data access requests directed to it. Advantageously, the present invention limits the time that clients of the repaired storage appliance are without connectivity, e.g., to the time between performance of the giveback operation by the surviving storage appliance to the beginning of a processing of data access requests by the repaired storage appliance.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Clustered Storage System Environment

Figure 1:
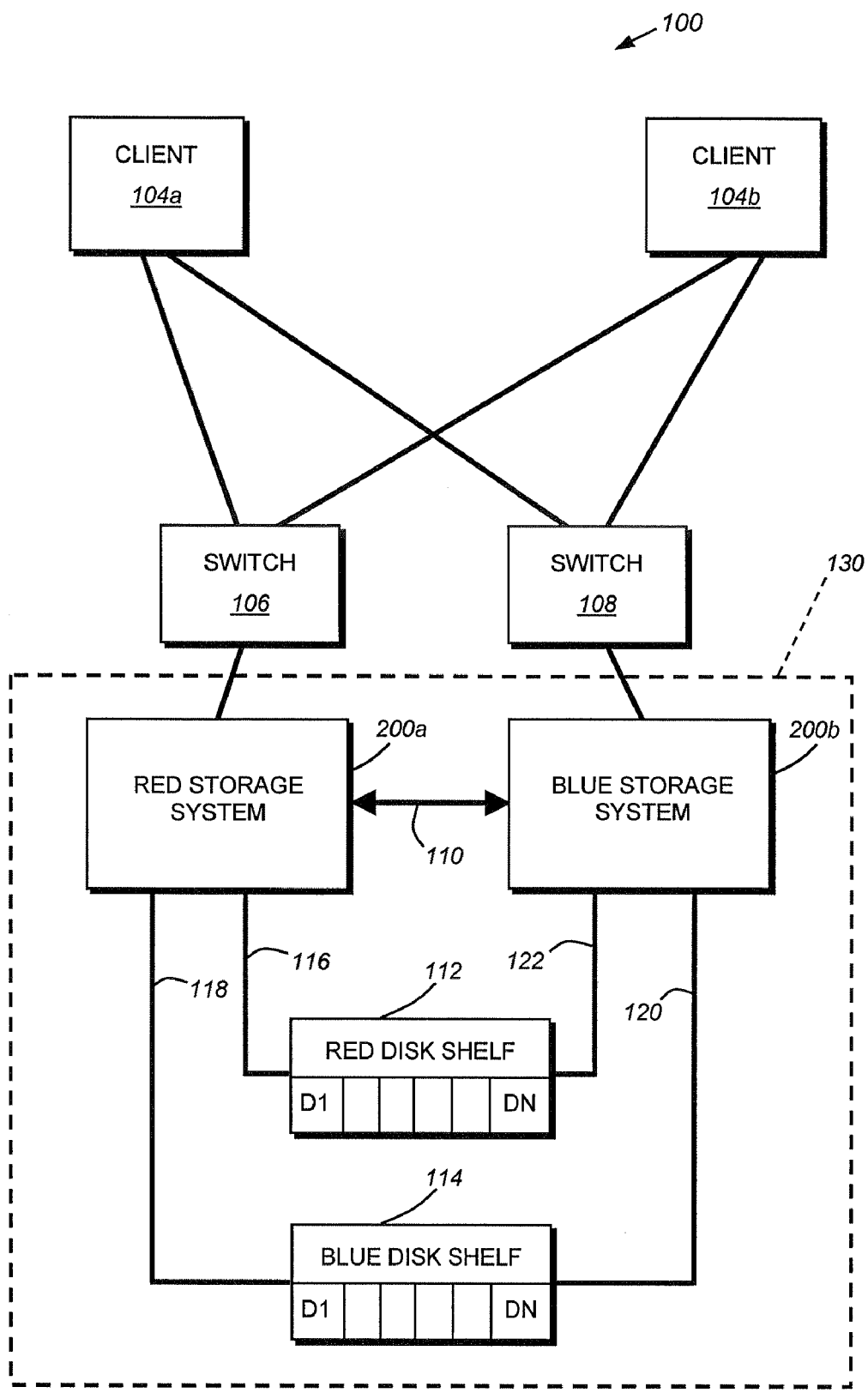
FIG. 1 is a schematic block diagram of a storage system cluster environment in accordance with an embodiment of the present invention.

FIG. 1 is a schematic block diagram of an exemplary network environment 100 in which the principles of the present invention are implemented. The network 100 includes several clients 104a, b interconnected with exemplary storage appliances 200, including Red Storage System and Blue Storage System, by switches 106 and 108. In alternate configurations the switches 106, 108 may be replaced with any suitable network configuration, including, for example, routers, bridges and/or hubs.

A client 104 may be a general-purpose computer, such as a PC or a workstation, or a special-purpose computer, such as an application server. Red Storage System 200a and Blue Storage System 200b are connected as two nodes of a storage system cluster 130. These storage systems, described further below, are illustratively embodied as storage appliances configured to control storage of and access to interconnected storage devices organized as disk shelves 112 and 114.

In the illustrated example, Red Storage System 200a is connected to Red Disk Shelf 112 by a data access loop 116, which is the Red Disk Shelf's primary loop, described further below. It should be noted that such a data access loop can be any acceptable networking media including, for example, a Fibre Channel Arbitrated Loop (FCAL). Similarly, the Red Storage System 200a accesses Blue Disk Shelf 114 via counterpart data access loop 118. Likewise, Blue storage system 200b accesses Blue Disk Shelf 114 via data access loop 120, which is the Blue Disk Shelf's primary loop, and Red Disk Shelf 112 through counterpart data access loop 122. Each disk shelf in the cluster is coupled to each storage appliance, thereby providing redundant data paths between the storage appliance and disks in the event of a failover. It should be noted that the Red and Blue disk shelves are shown directly connected to storage appliances 200 for illustrative purposes only. The disk shelves and storage appliances may be operatively interconnected in any suitable FC switching network topology.

During normal cluster operation, the storage appliance that is connected to a disk shelf via the disk shelf's primary loop is the "owner" of the disk shelf and is primarily responsible for servicing data requests directed to blocks on volumes contained on that disk shelf. Thus, in this example, the Red storage appliance owns the Red Disk Shelf 112 and is primarily responsible for servicing data access requests for blocks contained on the disks of that shelf. Similarly, the Blue storage appliance is primarily responsible for the Blue disk shelf 114. When operating as a storage appliance cluster, each storage appliance is configured to take over and assume data handling capabilities for the other disk shelf in the cluster 130 in the event of a failure to the other "partner" storage appliance.

Connecting the Red and Blue storage appliances is a cluster interconnect 110, which provides a direct communication link between the storage appliances. The cluster interconnect can be of any suitable communication medium, including, for example, an Ethernet connection or a FC data link.

B. Storage Appliance

Figure 2:
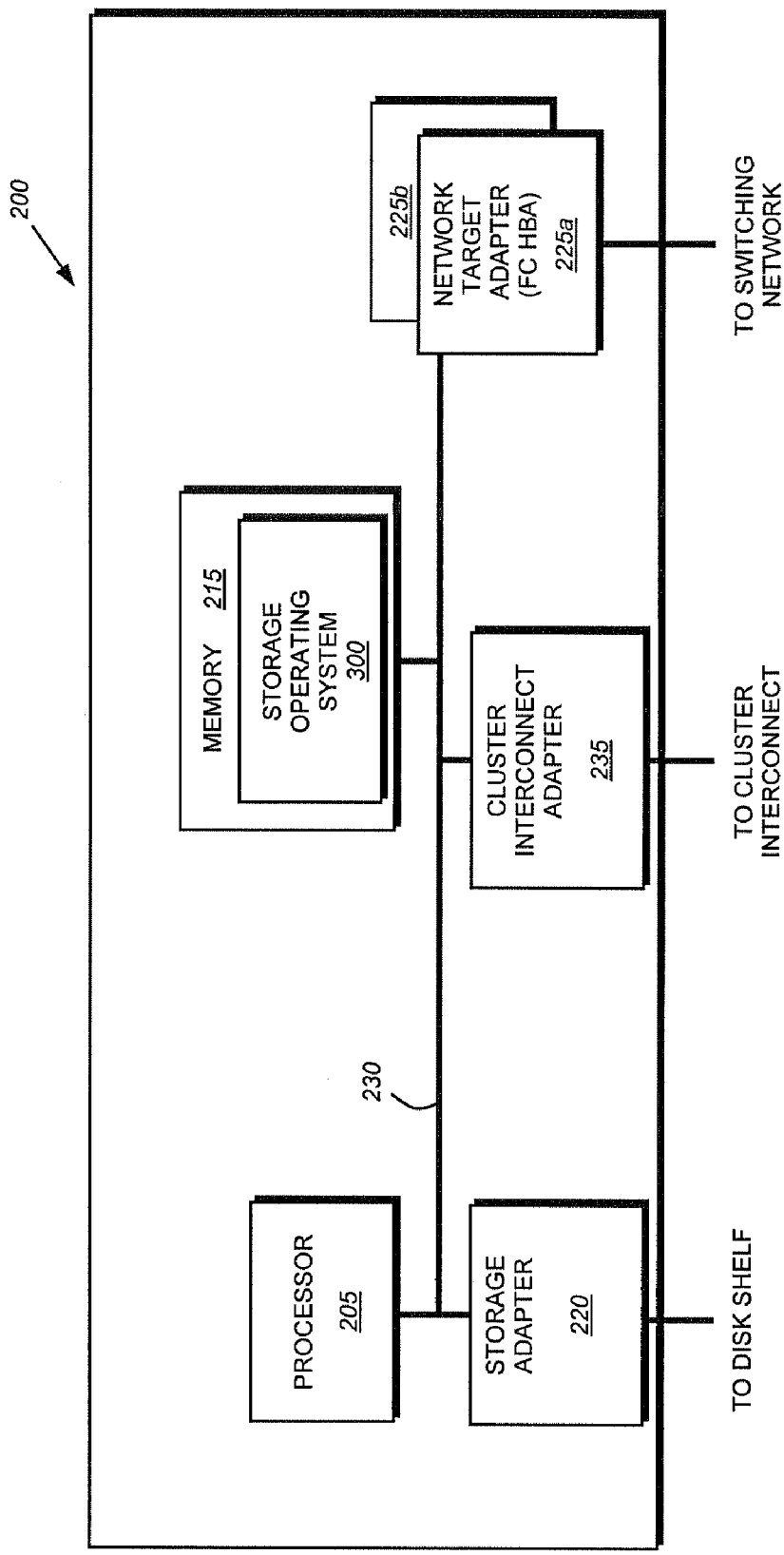
FIG. 2 is a schematic block diagram of an exemplary storage appliance in accordance with an embodiment of the present invention.

FIG. 2 is a schematic block diagram of an exemplary storage system 200 as used in cluster environment 100 and configured to provide storage service relating to the organization of information on storage devices, such as disks. The storage system 200 is illustratively embodied as a storage appliance comprising a processor 205, a memory 215, a plurality of network adapters 225a, 225b a cluster interconnect adapter 235 and a storage adapter 220 interconnected by a system bus 230. The cluster interconnect adapter 235 provides a specific network interface over the cluster interconnect 110 to a cluster partner of the storage appliance. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation storage appliances are further described in the above-referenced United States patent application entitled MULTI-PROTOCOL STORAGE APPLIANCE THAT PROVIDES INTEGRATED SUPPORT FOR FILE AND BLOCK ACCESS PROTOCOLS. The terms "storage system" and "storage appliance" may be used interchangeably herein. The storage appliance 200 also includes a storage operating system 300 that provides a virtualization function to logically organize the information as a hierarchical structure of directory, file and virtual disk (vdisk) storage objects on the disks. While this example is written in terms of SAN/NAS based storage appliances, it should be noted that the principles of the present invention apply to any acceptable cluster system, including NAS only or SAN only storage systems.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and b couple the storage appliance to a plurality of clients over point-to-point links, wide area networks (WAN), virtual private networks (VPN) implemented over a public network (Internet), a shared local area network (LAN) or any other acceptable networking architecture. These clients 104 may be configured to access the information stored on the storage appliance as blocks or disks. For this SAN-based network environment, the storage appliance is coupled to an illustrative FC switch 106, 108. Each network adapters 225 may comprise a FC host bus adapter (HBA) having the mechanical, electrical and signaling circuitry needed to connect the storage appliance 200 to the switch 106, 108. In addition to providing FC access, the FC HBA may offload FC network processing operations from the storage appliance's processor 205.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200. In SCSI terminology, clients 104 operating in a SAN environment are initiators that initiate requests and commands for data. The multi-protocol storage appliance is thus a target configured to respond to the requests issued by the initiators in accordance with a request/response protocol. According to the FC protocol, initiators and targets have three unique identifiers, a Node Name, a Port Name and a Device Identifier. The Node Name and Port Name are worldwide unique. A Device Identifier is assigned dynamically by an FC port of the FC switch that it the initiator/target is attached to and is unique within a given FC switching fabric.

The appliance 200 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 200) by issuing iSCSI and/or FCP messages over the network 100 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets or messages and returned to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other configurations (e.g. RAID0, RAID1, RAID 4, RAID 5 or RAID DP (Diagonal Parity)) are contemplated. A further discussion of RAID is found in commonly owned U.S. patent application Ser. No. 10/394,819, entitled QUERY-BASED SPARES MANAGEMENT TECHNIQUE, by Loellyn Cassell, et al., now issued as U.S. Pat. No. 7,664,913 on Feb. 16, 2010. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with virtualization system code to provide a function that "virtualizes" the storage space provided by disks. The file system logically organizes the information as a hierarchical structure of directory and file objects (herein-after "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as (vdisks) on the disks. A virtual disk (vdisk) is a special file type in a volume that derives from a plain (regular) file, but that has associated export controls and operation restrictions that support emulation of a disk. Unlike a file that can be created by a client using, e.g., the Network File System (NFS) or Common Internet File System (CIFS) protocol, a vdisk is created on the storage appliance via, e.g. a user interface (UI) as a special typed file (object). Illustratively, the vdisk is a multi-inode object comprising a special file mode that holds data and at least one associated stream mode that holds attributes, including security information. The special file mode functions as a main container for storing data associated with the emulated disk. The stream mode stores attributes that allow luns and exports to persist over, e.g., reboot operations, while also enabling management of the vdisk as a single disk object in relation to SAN clients. This virtualization provides an integrated NAS and SAN appliance approach to storage by enabling file-based (NAS) access to the files and directories, while further emulating block-based (SAN) access to the vdisks on a file-based storage platform.

C. Storage Operating System

In the illustrative embodiment, the storage operating system is the NetApp® Data ONTAP™ operating system that implements a Write Anywhere File Layout (WAFL™) file system. However, it is expressly contemplated that any appropriate storage operating system, including a write in-place file system, may be enhanced for use in accordance with the inventive principles described herein. As such, where the term "ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
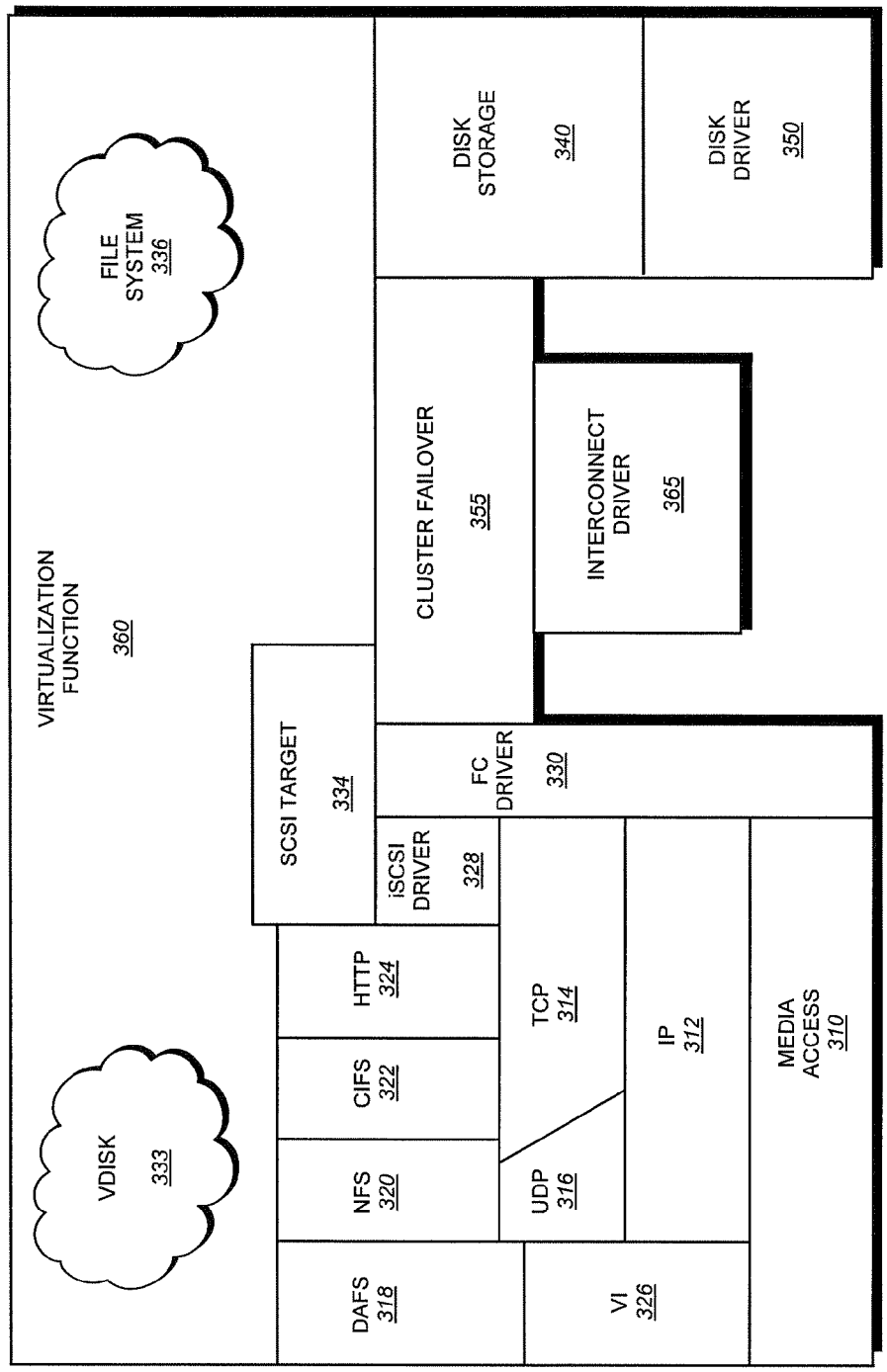
FIG. 3 is a schematic block diagram of an exemplary storage operating system for use with the exemplary storage appliance of FIG. 2 in accordance with an exemplary embodiment of the present invention.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS)

protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., vdisk module 333 and SCSI target mode 334. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks. By "disposing" SAN virtualization over the file system 336, the multi-protocol storage appliance reverses the approaches taken by prior systems to thereby provide a single unified storage platform for essentially all storage access protocols.

The file system 336 illustratively implements the Write Anywhere File Layout (WAFL) file system having an on-disk format representation that is block-based using, e.g., 4 kilobyte (KB) blocks and using modes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998.

The storage operating system 300 further includes, in the illustrative embodiment, a cluster failover layer 355 that implements various failover features including initiating a failover and performing the novel coordinated bringup technique, described further below. To that end, the cluster failover layer 355 monitors the cluster interconnect 110, via interconnect driver 365, for "heartbeat" signals sent between the storage appliances in the cluster. The heartbeat signals alert each storage appliance in the cluster that its partner storage appliance is operational. The clustered failover layer also in the illustrative embodiment, monitors an on-disk mailbox for a heartbeat signal from a partner storage appliance.

D. Coordinated Bringup of a Storage Appliance

After a failover procedure is performed and the failed storage appliance is repaired, the newly-repaired storage appliance needs to be re-initialized so that it may begin to service data access requests. Such "bring-up" of the repaired storage appliance is coordinated with the surviving storage appliance of the storage system cluster 130 to minimize the length of time that clients are without data connectivity. By coordinating with each other, the storage appliances reduce the possibility of performing a giveback operation to an improperly operating storage appliance, or a situation where a repaired storage appliance fails to reinitialize and the surviving storage appliance fails to perform another takeover, thereby causing a further loss of connectivity.

Figure 4:
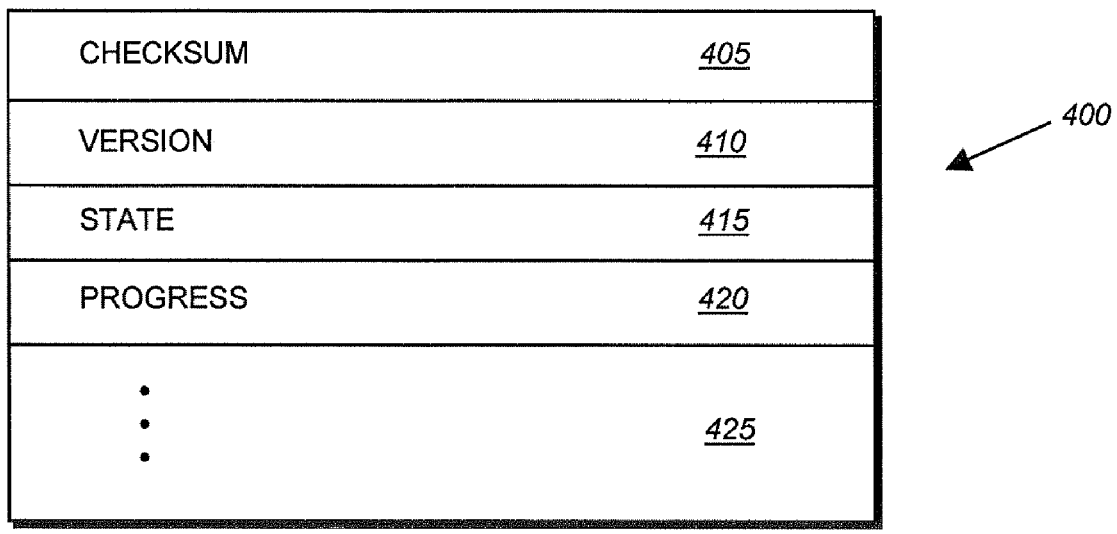
FIG. 4 is a schematic block diagram of an exemplary in-memory state data structure in accordance with an embodiment of the present invention.

During the re-initialization, the repaired storage appliance modifies an in-memory state data structure 400 to track its progress. FIG. 4 is a schematic block diagram of the in-memory state data structure 400 includes a checksum field 405, a version field 410, a state field 415, a progress field 420 and, in alternate embodiments, additional fields 425. The checksum field 405 contains a checksum value that is utilized by the storage operating system to verify that the state data structure 400 has not been corrupted by, for example, a memory error. The version field 410 identifies the version of the storage operating system executing on the storage appliance. The state field 415 identifies a current state of the storage operating system during the initialization process. The progress field 420 contains a monotonically increasing value that is updated throughout the initialization progress. In accordance with the illustrative embodiment, each storage appliances in a cluster configuration routinely performs remote direct memory address (RDMA) read operations to its partner storage appliance to obtain the state data structure. This permits each storage appliance to monitor the state and progress of its partner during initialization or during the initialization procedure.

When one of the storage appliances in the cluster 130 suffers an error condition that triggers a failover, the surviving storage appliance typically sends a number of "kill" packets over the cluster interconnect 100 to the failed storage appliance. These kill packets alert the failed storage appliance, to perform a reboot operation. (This is necessary in case the failed storage appliance is still alive but is malfunctioning.) Additionally, a failover may be initiated by, for example, a loss of a heartbeat signal over the cluster interconnect, or by a user-initiated command. The steps of the failover procedure are further described in the above-referenced U.S. patent application, entitled SYSTEM AND METHOD FOR TRANSPORT-LEVEL FAILOVER OF FCP DEVICES IN A CLUSTER, by Arthur F. Lent, et. al. Once the failed storage appliance has been repaired, it is typically brought on-line by rebooting or restarting the failed (now repaired) storage appliance.

Figure 5:
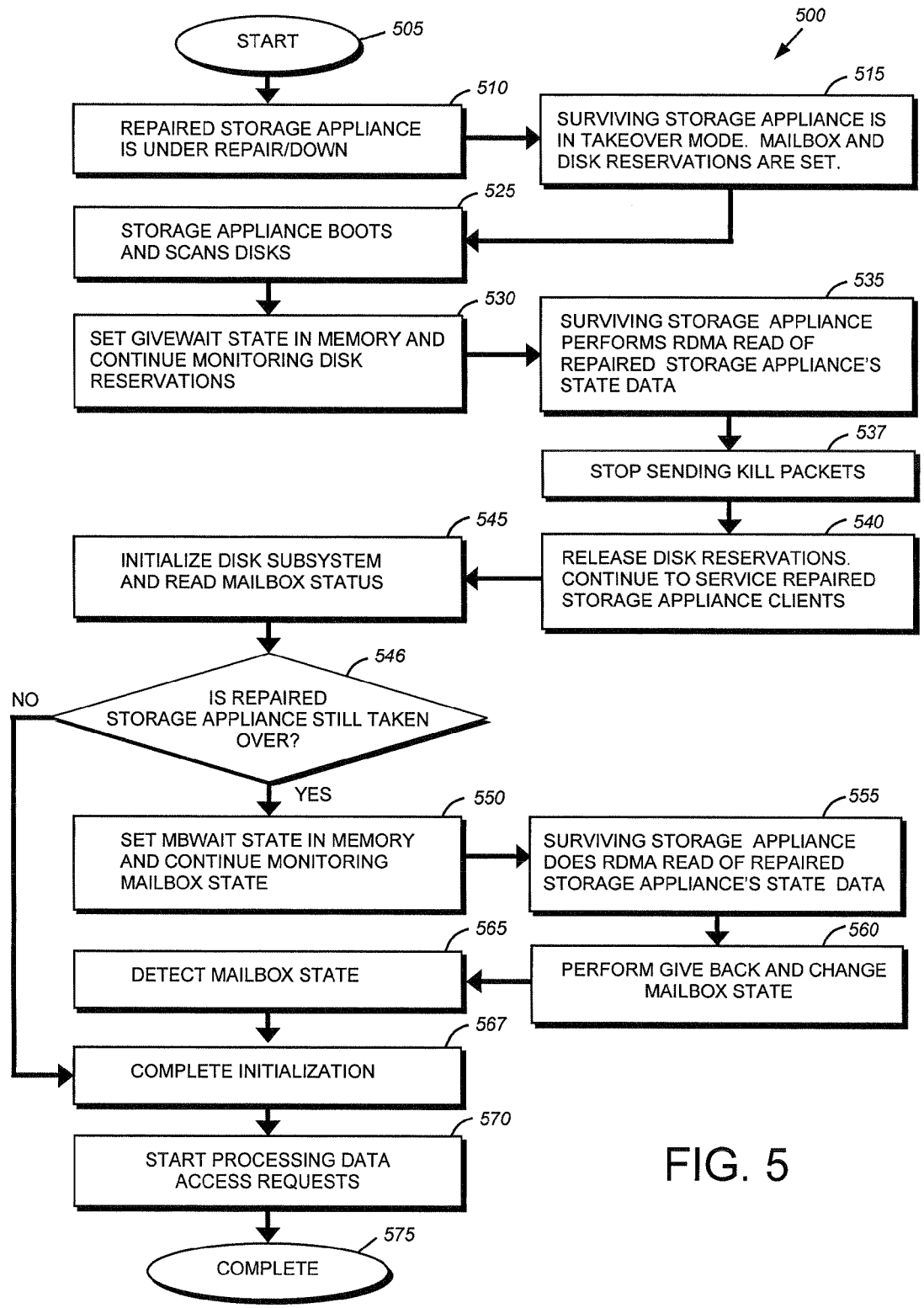
FIG. 5 is a flowchart detailing the steps of a coordinated bringup procedure in accordance with an embodiment of the present invention.

FIG. 5 is a flowchart detailing the steps of a coordinated bringup procedure 500 in accordance with the illustrative embodiment of the present invention. The procedure begins in step 505 and continues to step 510 when the repaired storage appliance is under repair or otherwise in a non-operable state. At the same time, in step 515, the surviving storage appliance enters a takeover mode in accordance with a takeover operation and processes data access requests directed to both the repaired and surviving storage appliances. During the takeover operation, the surviving storage appliance asserts appropriate SCSI disk reservations so that it may lock the disks that were owned by the repaired storage appliance preventing the repaired storage appliance from accessing the disks. Additionally, as described in the above-referenced patent application, appropriate mailbox settings are set to signify that the surviving storage appliance is in a takeover mode.

Once repaired, the failed (now-repaired) storage appliance boots and attempts to scan the disks to which it is connected to in step 525. However the disk scan fails, because of the asserted SCSI disk reservations. In response, the repaired appliance in step 530, asserts a GIVEWAIT state in field 415 of its state data structure 400 and continues to monitor the disk reservations. The GIVEWAIT state signifies that the repaired storage appliance awaits release of the asserted disk reservations by the surviving storage appliance.

In step 535, the surviving storage appliance performs a RDMA read operation of the repaired storage appliance's state data structure. As noted above, each storage appliance in a clustered configuration routinely performs RDMA read operations to obtain its partner's state data structure. Upon seeing the partner GIVEWAIT state, the surviving storage appliance stops sending kill packets (step 537) to the repaired storage appliance. Then, in step 540, the surviving storage appliance releases the disk reservations to those disks owned by the repaired storage appliance. However, the surviving storage appliance continues to service data access requests sent by clients of the repaired storage appliance.

Upon detecting that the disk reservations have been released, the repaired storage appliance initializes its disk subsystem and obtains the state of the disk mailbox in step 545. The repaired storage appliance, in step 546, validates that the repaired storage appliance remains taken over by the partner. If it is, the procedure continues to step 550. However, if it is not, then the partner completed a giveback unexpectedly and the procedure branches to step 567. In step 550, the repaired storage appliance sets an MBWAIT state in its state data structure and continues to monitor the on-disk mailbox state. The asserted MBWAIT state signifies that the repaired storage appliance has initialized its disk subsystem and awaits a change of state in the mailbox before continuing with its initialization.

In step 555, the surviving storage appliance detects the asserted MBWAIT state has been set by performing an additional RDMA read operation of the repaired storage appliance's state data structure. Once it has detected the MBWAIT state, in step 560, the surviving storage appliance performs a giveback operation by releasing resources, such as network addresses, utilized in servicing data access requests directed to the repaired storage appliances clients and changes the mailbox state to signify that it is no longer in a takeover mode. At this time, clients of the repaired storage appliance lose data connectivity as the surviving storage appliance is no longer servicing their data access requests.

In step 565, the repaired storage appliance detects the change in the mailbox state and, in step 567, completes its initialization routine. In step 570, the repaired storage appliance, which is now operational, begins processing and serving data access requests from its clients and the procedure completes in step 575. Using the coordinated bringup of the present invention, clients of the repaired storage appliance are without data connectivity from the time the surviving storage appliance performs the giveback operation (step 560) until the repaired storage appliance begins processing data access requests (step 570). This is a substantial reduction in the length of time that clients are without data connectivity compared to previous approaches.

To again summarize, the present invention provides a system and method for a coordinated bringup of a storage appliance in a storage system cluster. The repaired storage appliance sets a GIVEWAIT state in its state data structure when it has attempted to scan for its disks during its boot process. The surviving storage appliance detects this change of state when performing routine RDMA read operations and releases its disk reservations on the disks owned by the repaired storage appliance. The repaired storage appliance detects the release of the disk reservations and initializes its disk subsystem before setting a MBWAIT state in its state data structure. The repaired storage appliance reads the on-disk mailbox data and confirms that it is still taken over prior to setting the MBWAIT state in its state data structure. Again, the surviving storage appliance detects this change of state by performing routine RDMA read operations and performs a giveback operation that releases all resources acquired during the takeover operation. The repaired storage appliance, which is now operational completes its initialization and begins processing data access requests directed to it by clients. By ensuring that the repaired storage appliance is progressing with its boot operation, the surviving storage appliance can continue to service data access requests directed to the repaired storage appliance and thereby reduce the length of time that the clients are without data connectivity.

The foregoing description has been directed to specific embodiments of this invention. It will be apparent, however, that other variations and modifications may be made to the described embodiments, with the attainment of some or all of their advantages. Specifically, it should be noted that any number of HBAs may be utilized in accordance with the invention. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system, comprising:
a first storage system;
a second storage system coupled to the first storage system and configured to detect a failure of the first storage system, upon detection of the failure of the first storage system the second storage system placing reservations on data storage devices used by the first storage system, and the second storage system to begin servicing data access requests directed to the first storage system;
after repair of the first storage system, the first storage system to begin a boot operation, the first storage system to detect the reservations placed by the second storage system on the data storage devices, and in response to detecting the reservations halting the boot operation and writing to a memory a first state indicating that the first storage system is booting;
the second storage system reading the first state, and in response to reading the first state releasing the reservations and writing a second state into the memory;
in response to the second state written into the memory, the first storage system initializing the data storage devices, and writing a first message into the memory;
in response to the first message, the second storage system to no longer service the data access requests directed to the first storage system, the second storage system to release resources including the data storage devices to the first storage system, and the second storage system to write a second message into the memory; and
in response to the second message, the first storage system completes the boot operation and begins processing the data access requests directed to the first storage system.

2. The system as in claim 1, further comprising:
the resources released by the second storage system include network addresses utilized in servicing the data access requests directed to the repaired first storage system.

3. The system as in claim 1, further comprising:
the data storage devices include disks.

4. The system as in claim 1, further comprising:
the data storage devices include computer readable media.

5. The system as in claim 1, further comprising:
the data storage devices include memories.

6. The system as in claim 1, further comprising:
the data storage devices include tapes.

7. The system of claim 1, further comprising:
the second storage system to execute a giveback operation, the giveback operation to release one or more of the resources taken over in response to the failure of the first storage system.

8. The system of claim 7, further comprising:
the one or more resources are one or more of the network addresses.

9. The system of claim 1, further comprising:
the second message is a mailbox state that indicates that the second storage system is no longer servicing the data access requests directed to the first storage system.

10. The system of claim 9, further comprising:
the first storage system is further configured to detect the second message, complete initialization, and to process the data access requests directed to the first storage system.

11. The system of claim 1, further comprising:
the second storage system performs remote direct memory address (RDMA) read operations to read the memory within the first storage system.

12. The system as in claim 1, further comprising:
the resources released by the second storage system include the network addresses utilized in servicing the data access requests directed to the repaired first storage system.

13. A method for operating a first storage system operatively coupled to a second storage system, comprising:
detecting a failure of the first storage system by the second storage system;
placing reservations by the second storage system on data storage devices used by the first storage system, and the second storage system servicing data access requests directed to the first storage system;
after repair of the first storage system, beginning a boot operation by the first storage system, the first storage system detecting the reservations placed by the second storage system on the data storage devices, and in response to detecting the reservations halting the boot operation and writing to a memory a first state indicting that the first storage system is booting;
reading by the second storage system the first state, and in response to reading the first state, the second storage system releasing the reservations and writing a second state into the memory;
in response to the second state written into the memory, initializing by the first storage system the data storage devices, and writing a first message into the memory;
in response to the first message, the second storage system no longer servicing the data access requests directed to the first storage system, and the second storage system releasing resources including the data storage devices to the first storage system, and the second storage system writing a second message into the memory; and
in response to the second message, the first storage system completing the boot operation, and beginning processing the data access requests directed to the first storage system.

14. The method as in claim 13, further comprising:
including network addresses utilized in servicing the data access requests directed to the repaired first storage system in the resources released by the second storage system.

15. The method as in claim 13, further comprising:
using disks as the data storage devices.

16. The method as in claim 13, further comprising:
using computer readable media as the data storage devices.

17. The method as in claim 13, further comprising:
using memories as the data storage devices.

18. The method as in claim 13, further comprising:
using tapes as the data storage devices.

19. The method of claim 13, further comprising:
executing a giveback operation by the second storage system, the giveback operation to release one or more of the resources taken over in response to a failure of the first storage system.

20. The method of claim 19, further comprising:
including one or more network addresses as the one or more resources.

21. The method of claim 13, further comprising:
indicating that the second storage system is no longer servicing the data access requests directed to the first storage system by the second message.

22. The method of claim 13, further comprising:
configuring the first storage system to detect the second message, complete initialization, and to process the data access requests directed to the first storage system.

23. The method of claim 13, further comprising:
performing by the second storage system remote direct memory address (RDMA) read operations to read the memory within the first storage system.

24. The method as in claim 13, further comprising:
including TCP/IP protocols utilized in servicing data access requests directed to the repaired first storage system in the resources released by the second storage system.

25. A computer readable non-transitory storage media, comprising:
said computer readable storage media containing program instructions for execution on a processor for a method of operating a first storage system operationally coupled to a second storage system, the program instructions for,
detecting a failure of the first storage system by the second storage system;
placing reservations by the second storage system on data storage devices used by the first storage system, and the second storage system servicing data access requests directed to the first storage system;
after repair of the first storage system, beginning a boot operation by the first storage system, the first storage system detecting the reservations placed by the second storage system on the data storage devices, and in response to detecting the reservations halting the boot operation and writing to a memory a first state indicting that the first storage system is booting;
reading by the second storage system the first state, and in response to reading the first state, the second storage system releasing the reservations and writing a second state into the memory;
in response to the second state written into the memory, initializing by the first storage system the data storage devices, and writing a first message into memory;
in response to the first message, the second storage system no longer servicing the data access requests directed to the first storage system, and the second storage system releasing resources including the data storage devices to the first storage system, and the second storage system writing a second message into the memory; and
in response to the second message, the first storage system completing the boot operation, and beginning processing the data access requests directed to the first storage system.

* * * * *

UNITED STATES PATENT AND TRADEMARK OFFICE
CERTIFICATE OF CORRECTION

| | | |
|---|---|---|
| PATENT NO. | : 8,028,054 B1 | Page 1 of 1 |
| APPLICATION NO. | : 11/866011 | |
| DATED | : September 27, 2011 | |
| INVENTOR(S) | : Steven S. Watanabe et al. | |

It is certified that error appears in the above-identified patent and that said Letters Patent is hereby corrected as shown below:

In Col. 8, lines 5-8 should read as follows:
        file ~~mode~~ inode that holds data and at least one associated stream
        ~~mode~~ inode that holds attributes, including security information.
        The special file ~~mode~~ inode functions as a main container for storing
        data associated with the emulated disk. The stream ~~mode~~inode Signed and Sealed this
First Day of May, 2012

David J. Kappos
*Director of the United States Patent and Trademark Office*